United States Patent [19]
Fish et al.

[11] Patent Number: 5,828,876
[45] Date of Patent: Oct. 27, 1998

[54] FILE SYSTEM FOR A CLUSTERED PROCESSING SYSTEM

[75] Inventors: Robert W. Fish, West Chicago; Lawrence J. Schroeder, Wheaton, both of Ill.

[73] Assignee: NCR Corporation, Dayton, Ohio

[21] Appl. No.: 690,703

[22] Filed: Jul. 31, 1996

[51] Int. Cl.$^6$ .................................................. G06F 17/00
[52] U.S. Cl. ........................... 395/601; 395/609; 395/726
[58] Field of Search ................................... 395/601, 618, 395/617, 616, 609, 726, 180

[56] References Cited

U.S. PATENT DOCUMENTS

| | | | |
|---|---|---|---|
| 5,151,988 | 9/1992 | Yamagishi | 395/608 |
| 5,175,852 | 12/1992 | Johnson et al. | 395/608 |
| 5,202,971 | 4/1993 | Henson et al. | 395/608 |
| 5,218,695 | 6/1993 | Noveck et al. | 395/621 |
| 5,293,618 | 3/1994 | Tandai et al. | 395/457 |
| 5,301,290 | 4/1994 | Tetzlaff et al. | 395/469 |
| 5,317,749 | 5/1994 | Dahlen | 395/726 |
| 5,339,427 | 8/1994 | Elko et al. | 395/673 |
| 5,371,885 | 12/1994 | Letwin | 395/621 |
| 5,394,551 | 2/1995 | Holt et al. | 395/726 |
| 5,423,044 | 6/1995 | Sutton et al. | 395/726 |
| 5,463,772 | 10/1995 | Thompson et al. | 395/612 |
| 5,504,883 | 4/1996 | Coverston et al. | 395/618 |
| 5,564,011 | 10/1996 | Yammine et al. | 395/182.13 |
| 5,612,865 | 3/1997 | Dasgupta | 364/184 |
| 5,623,651 | 4/1997 | Jernigan, IV | 395/616 |

OTHER PUBLICATIONS

Mark Aldred et al., "A Distributed Lock Manager on Fault Tolerant MPP," Proceedings of the 28th Annual Hawaii International Conference on System Sciences, IEEE 1995, pp. 134–136, No Month Sep. 2, 1970.

Werner Zurcher, "The State of Clustered Systems," UNIX Review, vol. 13, No. 9, Aug. 1995, pp. 47–51.

Shinjj Sumimoto, "Design and Evaluation of Fault–Tolerant Shared File System for Cluster Systems," 1996 Int'l Symposium on Fault–Tolerant Computing (FTCS 26), IEEE, 1996, pp. 74–83, No Month Sep. 2, 1997.

Keith Walls, "Disk Management Considerations in a Local Area VAXcluster," VAX Professional, vol. 14, No. 4, Jul.–Aug. 1992, pp. 7–11.

*Primary Examiner*—Paul V. Kulik
*Attorney, Agent, or Firm*—James M. Stover

[57] ABSTRACT

An improved file system for managing data storage and retrieval in a clustered UNIX computer system including a plurality of processing nodes and an interconnection network connecting the processing nodes. The improved file system includes a data storage device, such as a disk storage unit, connected via a shared SCSI interconnect with each one of the processing nodes, rather than connected directly with a single processing node. The structure layout for the file system, which is maintained on the data storage device, includes sufficient information to enable all of the processing nodes to access said file system. The layout comprises: superblocks containing offsets to all other file system structures within the file system; a free inode bit map containing a plurality of bits, each bit representing an inode within the file system; a modified inode journal containing a separate inode bit map for each superblock and identifying particular inodes which have been modified by the file system prior to a system failure; a plurality of inodes, each inode being a data structure which contains a definition for each particular file and directory in the file system; a free block bit map containing a bit map wherein each distinct bit represents a logical disk block in the file system; and data blocks containing data representing file contents. The file system interfaces with the computer system's distributed lock manager (DLM) to coordinate file system usage.

5 Claims, 5 Drawing Sheets

FILE SYSTEM FOR A CLUSTERED PROCESSING SYSTEM

The present invention relates to clustered processing systems wherein multiple processing nodes share access to a common data storage device and, more particularly, to an improved file system for managing data storage and retrieval in a clustered processing system.

BACKGROUND OF THE INVENTION

A file system is a collection of management structures which impose a logical structure upon a storage device, typically a disk storage device, in order to let an arbitrary set of users construct and store "files" of user data in a way the allows later retrieval of that data using file names. A file system can contain many files for many users at the same time. In order to perform this task, the file system executable code—a part of the operating system—needs to dynamically construct many data structures that exist inside the dynamic computer's memory, as well as others that are stored with the file system itself on the storage device. Many of these data structures need to exist both in computer memory and on the storage device. Essentially most of the necessary data structures are loaded from the disk storage device into computer memory at initial access time, referred to as mount time. As structures are modified by dynamic activities, such as a user request to create a new file, these changing structures are modified in the computer memory but only scheduled to be rewritten to the storage device at some arbitrary point in the future. When the last access to a file system is made, referred to as unmount time, all data structures remaining in memory are flushed to the data storage device.

A cluster file system is a product that allows multiple processing nodes of a loosely coupled cluster of processing nodes to simultaneously access the same file system data store which exists on a data storage device shared by the processing nodes. Access to the file system data store is direct with no one processing node functioning as a server responsible for the data storage device. Each node views the file system as essentially a locally accessible resource.

Because a file system is dynamic and consists of structures on both the data storage device as well as in the computer memory, there exists a need to make certain that accurate and accessible data exists on the storage device to allow all of the processing nodes in the cluster to properly access the file system. In addition, as the processing nodes only share the data storage device, not the computer memory, a significant amount of internode communication needs to take place in order to correctly synchronize the data. A system for minimizing the amount of internode communication in order to obtain reasonable performance is desired.

OBJECTS OF THE INVENTION

It is therefore an object of the present invention to provide a new and useful file system design for use within a clustered computer system.

It is another object of the present invention to provide such a system which permits simultaneous and direct access the same file system disk store from multiple nodes in a cluster.

It is another object of the present invention to provide such a system in which internode communication and contention are minimized in order to maintain a cluster file system in a coherent state.

SUMMARY OF THE INVENTION

There is provided, in accordance with the present invention, an improved file system for managing data storage and retrieval in a clustered UNIX computer system including a plurality of processing nodes and an interconnection network connecting the processing nodes. The improved file system includes a data storage device, such as a disk storage unit, connected via a shared SCSI interconnect with each one of the processing nodes, rather than connected directly with a single processing node. The structure layout for the file system, which is maintained on the data storage device, comprises: superblocks containing offsets to all other file system structures within the file system; a free inode bit map containing a plurality of bits, each bit representing an inode within the file system; a modified inode journal containing a separate inode bit map for each superblock and identifying particular inodes which have been modified by the file system prior to a system failure; a plurality of inodes, each inode being a data structure which contains a definition for each particular file and directory in the file system; a free block bit map containing a bit map wherein each distinct bit represents a logical disk block in the file system; and data blocks containing data representing file contents.

In the described embodiment, the clustered computer system includes a distributed lock manager (DLM) for coordinating file system access among the processing nodes. An interface daemon interfaces the file system with the DLM, permitting the file system to coordinate file system utilization through the DLM.

The above and other objects, features, and advantages of the present invention will become apparent from the following description and the attached drawings.

DETAILED DESCRIPTION OF THE PREFERRED EMBODIMENT

1. Overview

Figure 2:
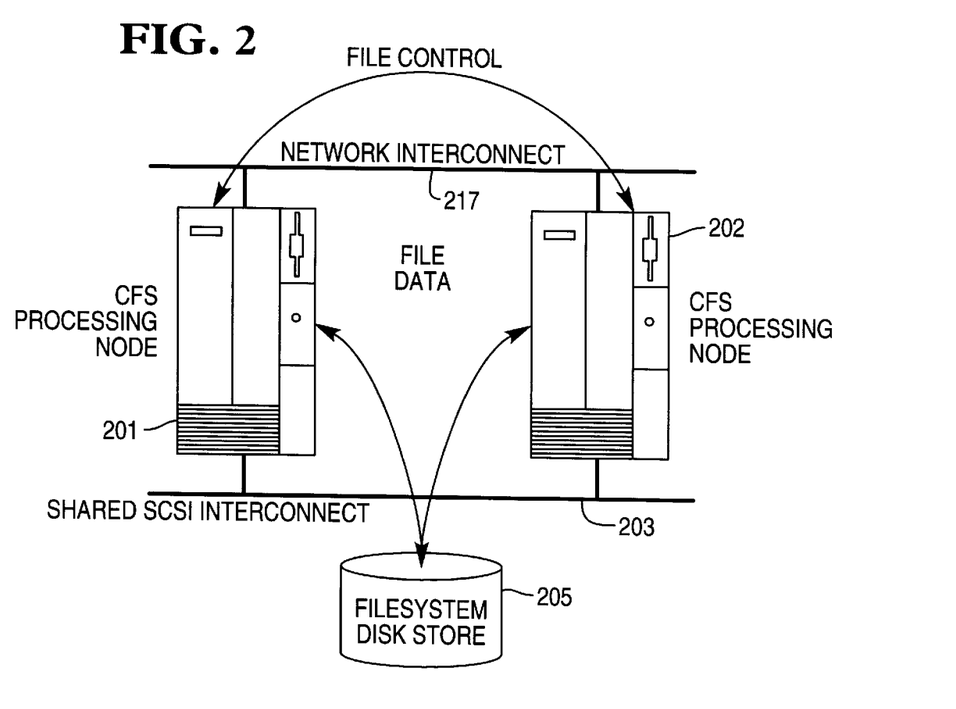
FIG. 2 is a simple illustration of a clustered computer system including multiple processing nodes, a common filesystem disk store shared by the processing nodes, and employing an improved file system for managing data storage and retrieval in accordance with the present invention.

The Cluster File System (CFS) described herein provides a mechanism to directly access a common file system disk store simultaneously from all nodes in a cluster of UNIX-based processors. In a CFS cluster, such as is shown in FIG. 2, from two to eight system nodes 201 and 202 utilize a shared SCSI bus 203 to provide users with access to a common data storage device 205. A Distributed Lock Manager (DLM) system coordinates access privileges while assuring data integrity.

From the viewpoint of any node in the cluster, CFS is a true file system. The file system is mounted independently and a full complement of file system activities can be performed on every part of the file system. CFS also supports all standard file system commands. CFS by itself does not guarantee application integrity, applications must coordinate themselves using some operating system coordination mechanism. Although traditional UNIX mechanisms, such as signals, pipes, streams, shared memory and IPC messages, are not available across a cluster, CFS does provide cluster-wide file and record locking. Any applications that use file and record locking or traditional network-based coordination mechanisms, such as sockets or TLI, can be distributed in a CFS cluster without change.

CFS improves data availability by enabling distribution of users over multiple system nodes while providing performance typical of a local file system. Although CFS uses the network 207 for coordination of file access, it transmits no user data over the network. Because CFS distributes processing over all the nodes in the cluster, CFS eliminates the downtime experienced when a central server fails. Should one or more of the CFS cluster nodes fail, the remaining nodes continue to perform all file system activities without interruption on any file in the file system, with the exception of those in use on the failed node.

1.1. CFS Compared to NFS

In the sense that CFS provides multiple nodes access to a file store, CFS is similar to a Network File System (NFS). CFS, however, offers faster service, higher availability, and greater SVID compatibility than NFS. CFS provides faster service because the cluster provides multiple processors instead of only one server. CFS improves performance because, while NFS transmits all data over the network, CFS transmits no user data over the network. CFS improves availability by providing the fault resilience of the cluster environment and eliminating the central server required by NFS.

Within CFS coordination of file access is accomplished by using the network 207 wherein each node directly accesses the file system disk store 205 in order to read and write data. FIG. 2 illustrates the processing flow for a two-node CFS cluster (CFS supports clusters of up to eight nodes).

Figure 1:
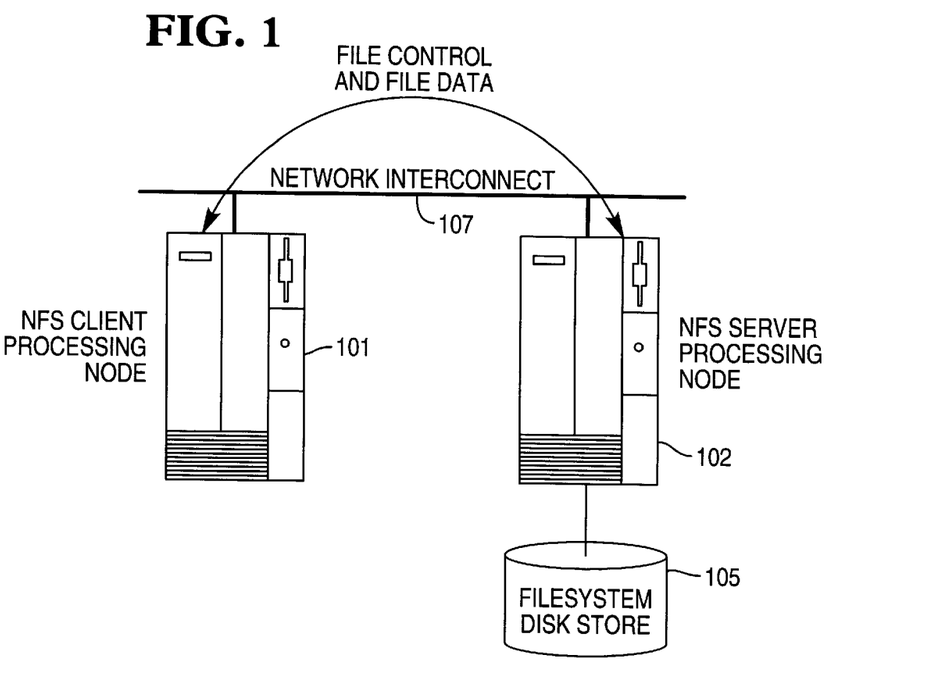
FIG. 1 is a simple illustration of a conventional clustered computer system including multiple processing nodes, a filesystem disk store associated with one of the processing nodes, and employing a network file system (NFS) for managing data storage and retrieval.

A similar NFS configuration would have all file control and data access occurring through the network 107, as shown in FIG. 1. Note the total dependency of the client 101 upon the viable presence of the server 102.

2. CFS Layout

The unique aspect of the CFS product is that multiple UNIX systems will be capable of performing file system actions on a single disk image of the file system. Each individual UNIX system will possess an in-core image of some of the file system structures. These images must be coordinated to ensure that multiple systems do not conflict over contents of the file system or destroy file integrity. The means for this coordination is through DLM locks and file system data structures which permit multiple systems to modify exclusive portions of the shared disk file system simultaneously. This section describes the file system data structures and layout.

Fundamental in the cluster file system layout is the use of inodes and data blocks with similarities to many UNIX file systems. In order to provide the maximum capability for parallelism in the cluster, the layout contains several data structures which are generally exclusive to each individual system within the cluster, specifically individual superblocks and modified inode journals.

In conventional UNIX file systems, data structures such as inodes are usually stored with multiple instances in a single disk block. In a cluster file system such an arrangement would complicate and impede the performance for multiple nodes performing actions on different files whose data structures were all in a single disk block; therefore each inode is segregated and maintained in individual blocks.

Figure 3:
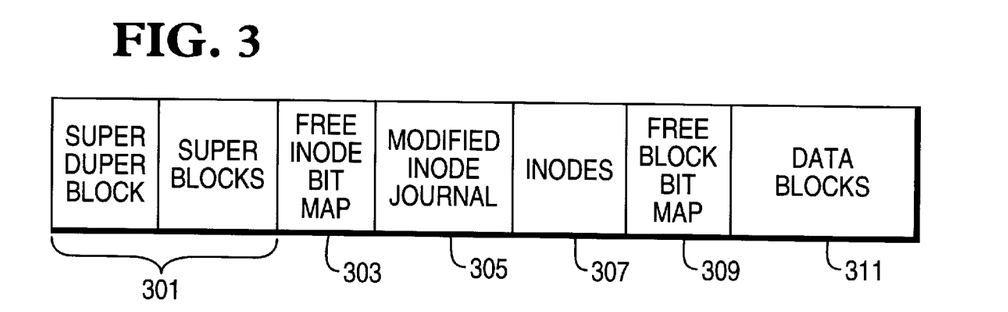
FIG. 3 is a block diagram of the file system layout for a cluster file system (CFS) in accordance with the present invention.

The overall cluster file system layout is shown in FIG. 3. Logical block size in the Cluster File System is 2048 (2K) bytes. Unlike most other UNIX file systems, the Cluster file system does not contain a boot block; the superblock structures start at the beginning of the disk device, i.e. logical and physical block 0. No boot block is needed as there is no possibility or intent that UNIX system root file systems exist on a cluster file system.

The cluster file system layout includes the following elements:

Superblocks 301

Superblocks contain the high level information about the file system and its status. The cluster file system will have at least as many superblocks as the maximum expected number of UNIX systems in the cluster. The actual number of superblocks created for a given CFS file system will be determined at the time the file system is created ("mkfs"). Each superblock contains a number of values which define the size and makeup of the superblock structure. A set of these values is determined at the time the file system is created and contained within a structure within each superblock called a "superduperblock". The parameters contained within the superblocks are the same in all superblocks, i.e., total number blocks, inodes, logical block offsets to parts of the file system layout. Other element values in each superblock will be distinct between different superblocks; such as free inode and block arrays.

Each cluster UNIX system will utilize a distinct superblock determined at mount time, either by an explicit parameter to mount or by the mount command itself through attempts to gain an exclusive DLM lock on potential superblock resources. No two cluster systems will ever mount using the same superblock, this event being prevented through the acquisition of superblock DLM locks at an exclusive level.

Superblock data structure definition:

```
struct superduper }
int      sd_bsize;        /* logical block size */
int      sd_nsb;          /* number of superblocks */
int      sd_ninode;       /* number of inodes */
int      sd_ndata;        /* number of data blocks */
short    sd_dinfo[4];     /* device information */
char     sd_fname[6];     /* file system name */
```

-continued

```
char     sd_fpack[6];            /* file system pack name */
int      sd_imap;                /* block offset: 1st inode bitmap */
int      sd_imodmap;             /* block offset: used inode bitmap */
int      sd_inode;               /* block offset: 1st inode */
int      sd_fbmap;               /* block offset: free block bitmap */
int      sd_onlinefsck;          /* count of online fscks since last
                                    offline fsck */
};
/*
 * Structure of each super-block.
 */
struct filsys
{
struct   superduper s_sd;        /* copy of superduper used
                                    internally */
u_short  s_isize;                /* size in blocks of i-list */
daddr_t  s_fsize;                /* size in blocks of entire volume */
short    s_nfree;                /* number of addresses in s_free */
daddr_t  s_free[CFSNICFREE];     /* free block list */
short    s_ninode;               /* number of i-nodes in s_inode */
ino_t    s_inode[CFSNICINOD];    /* free i-node list */
char     s_flock;                /* lock during free list
                                    manipulation */
char     s_ilock;                /* lock during i-list manipulation */
char     s_fmod;                 /* super block modified flag */
char     s_ronly;                /* mounted read-only flag */
time_t   s_time;                 /* last super block update */
daddr_t  s_tfree;                /* total free blocks*/
ino_t    s_tinode,               /* total free inodes */
long     s_superb,               /* superblock number */
long     s_state;                /* file system state */
long     s_magic;                /* magic number to indicate new file
                                    system */
};
```

Each cluster UNIX system will hold an in-core image of its superblock and operate against it. The superblock on disk is used for storing the values when the individual system unmounts from accessing the filesystem. The disk superblock will also indicate the state of the superblock and its view of the filesystem (s_state). This state will indicate the following conditions:

FsOKAY the superblock information was correct the last time this superblock for the filesystem was unmounted.

FsACTIVE the superblock is or was in use. If the mount finds the superblock indicating active state then a fsck will be necessary prior to mounting since the last system to have changed the filesystem via this superblock must not have unmounted it.

FsBAD The last unmount of the filesystem using this superblock had indications that some corruption existed.

Within each superblock are lists of free inodes and blocks; these are kept unique for each superblock.

The free inode list (s_inode) contains CFSNICINOD free inode numbers. CFSNICINOD will be 50. When a system finds that its own free inode list is empty and it needs to allocate an inode, then it must collect up more free inodes into its own free inode list from the common shared image of free inodes on the disk in the free inode bit map. The coordination of this shared pool of free inodes is through the free inode DLM lock resource.

The free block list (s_free) contains CFSNICFREE free block logical addresses. CFSNICFREE will be the maximum value possible to fill out the superblock size to the logical block size (2048 bytes). [several hundred free blocks] When a system finds that its own free block list is empty and it needs to allocate a block, then it must collect up more free blocks into its own free block list from the common shared image of free blocks on the disk in the free block bit map. The coordination of this shared pool of free blocks is through the free block DLM lock resource.

Free Inode Bit Map 303

This area of the filesystem layout contains a bit map where a distinct "bit" represents each inode in the filesystem. The purpose of the bitmap is to re-supply free inodes to an individual superblock when an active system exhausts its own "individual" inode free list. Within the bitmap a inode bit will be one (1) if that inode is "free" and has not been placed on any superblock's free inode list; it will be zero otherwise.

The use and manipulation of the free inode bit map is coordinated through several DLM lock resources:
  free inode resource
  free inode bitmap resource Using the resource locks the bitmap would be scanned by a system needing free inodes and marked free inodes would be collected into its own free inode list and the corresponding bit "flipped" to zero. In the case where a system would exceed the bounds of its free inode array and it has to free another inode; then the bitmap would be modified to indicate the respective inodes are "free" (set to 1) after removing the inode from its own free list.

This use of the bitmap eliminates the need to scan through the inodes themselves to find free ones; improving performance by having less contention and disk I/O during inode allocations.

To additionally assist in reducing contention for the same portion of the inode bitmap, the value from the free inode resource lock will indicate which portion of the free inode bit map to use next. Refer to the DLM free inode resource section for more detail.

The online recovery mechanism will not be responsible for auditing and restoring lost free inodes to the bitmap. The off-line full fsck facility will return all free inodes to the free inode bitmap and thus handle correcting the filesystem for lost free inodes.

The size of the free inode bit map will be determined by the number of inodes in the file system (controlled by parameters to mkfs).

The number of logical blocks used for the bit map is the rounded up value of: (#_of_inodes)/(size_of_logical_block_in_bytes * 8)

Modified Inode Journals 305

The Modified Inode Journal contains a separate inode bit map for each superblock. An individual Modified Inode Journal bitmap will provide indication to the on-line recovery function that particular inodes may have been modified by the respective system prior to a system failure (and thus may be damaged). A bit representing a specific inode is set (=1) whenever an in-core inode is created and an exclusive inode lock is acquired prior to any modification. The bit is cleared whenever an inode lock is closed (and the bit had previously been set).

The size of the Modified Inode Journal is determined by the number of superblocks (max # of cluster nodes possible) and the number of inodes in a particular filesystem. Every CFS system at the time of mounting a cluster file system utilizes a unique superblock, and also will use the respective unique Modified Inode Journal bitmap.

The use of this journal eliminates the need to scan all inode blocks during online recovery thus improving online recovery performance.

To reduce the amount of disk writes for a given Modified Inode Journal, writes of the incore image to disk need only be performed when a modified inode bit is set which was previously not set (zero). This means that for most file activity which modifies a inode and its data blocks (thereby requiring exclusive inode lock at times) the respective write to disk of the incore modified inode bitmap block would only occur once for as long as the file remains open in the system. It is not necessary to write the incore image of the modified inode bitmap block when a bit is reset; at some point due to other activity in the system the image may get written.

Inodes 307

An inode is the data structure which contains most of the definition of a particular file or directory in the file system. Each inode in the filesystem is within a distinct logical disk block of size 2048 bytes. The inode data structure itself takes up only a portion of the logical block; therefore part of the remaining block can be used for actual data. At present the design utilizes 1024 bytes of data. Note that in most conventional UNIX file systems, structures like an inode might be grouped together with multiple inodes residing in the same disk block, however such an implementation for CFS would likely result in the possibility of higher inter-node lock contention and is therefore avoided.

Inodes structures stored on disk differ somewhat from the incore Inode structure. The disk inode contains a subset of the incore information. The inode (disk) data structure definition is as follows:

```
struct dinode {
    mode_t    di_mode;              /* mode and type of file */
    nlink_t   di_nlink;             /* number of links to file */
    uid_t     di_uid;               /* owner's user id */
    gid_t     di_gid;               /* owner's group id */
    off_t     di_size;              /* number of bytes in file */
    daddr_t   di_addr[CFSNADDR];    /* disk block addresses */
    time_t    di_atime;             /* time last accessed */
    time_t    di_mtime;             /* time last modified */
    time_t    di_ctime;             /* time created */
    uchar_t   di_gen;               /* file generation number */
    char      data[1];              /* placeholder:
                                       short file data storage */
};
```

Access to an inode or its respective data blocks is coordinated through the use of DLM lock resources.

One negative effect of having inodes being segregated into individual data blocks with the requirement for acquisition of a DLM resource lock for each inode is that some inode intensive operations will be degraded. A prime example of this is the UNIX "1s-1" command which must access all inodes in a directory. Care should be taken in the application of uses for the Cluster File System to avoid such operations when possible to maintain the best performance.

The inode data structure array element di_addr contains CFSNADDR (32) addresses. Depending on which element of the array each address is determines whether the address points to data or indirect arrays of addresses. The last 3 addresses within di_addr are indirect addresses of blocks; whereas the remainder are direct block addresses. Of the indirect block addresses, they are respectively for single, double, and triple level indirection. Given that in the CFS layout, space within the logical block which contains the inode is "available" due to the segregation of inodes to distinct disk blocks:

the size of the disk block array is somewhat increased over that found in file systems such as UNIX S5 disk version of the inode contains actual disk block addresses as opposed to compressed encoded versions of the addresses.

This extra space consumption can provide some positive tradeoff in performance by the increased likelihood of direct data block addressing (larger array) and less time to compute the actual disk address (eliminating the compressed encoded address)

The use of the remaining portion of the inode logical block for file data will also improve the filesystem is two areas:

Quick access to small files (or potentially the last small part of files which fit the remainder of data in the inode logical block)

High filesystem integrity to very small files; since any changes to the file content and the file inode could occur within the same disk I/O action.

Free Block Bit Map 309

This area of the filesystem layout contains a bit map where a distinct "bit" represents each logical disk block in the filesystem. The purpose of the bitmap is to re-supply free disk blocks to an individual superblock when an active system exhausts its own "individual" free block list. Within the bitmap a disk block bit will be one (1) if that disk block has not been allocated anywhere in the filesystem and has not been placed on any superblock's free disk block list and will be zero (0) otherwise.

The use and manipulation of the free disk block bit map is coordinated through several DLM lock resources:

free disk block resource free disk block bitmap resource release free blocks resource Using the resource locks the bitmap would be scanned by a system needing free disk blocks and marked free disk blocks would be collected into its own free disk block list and the corresponding bit "flipped" to zero. In the case where a system would exceed the bounds of its free disk block array and it has to free another disk block; then the bitmap would be modified to indicate the respective disk blocks are "free" (set to 1) after removing the disk block(s) from its own free list.

To minimize contention for the same portion of the disk block bitmap, the value returned when acquiring the free disk block resource lock will indicate which portion of the free disk block bit map to use next. Refer to the DLM free disk block resource section for more detail.

The online recovery mechanism will not be responsible for auditing and restoring lost free disk blocks to the bitmap. The off-line full fsck facility will return all free disk blocks to the free disk block bitmap and thus handle correcting the filesystem for lost free disk blocks.

The size of the free disk block bit map will be determined by the number of disk blocks in the file system (controlled by parameters to mkfs). The number of logical blocks used for the bit map is the rounded up value of (#_of_disk blocks)/(size_of_logical_block_in_bytes * 8)

In the situation that a system attempts to get free disk blocks by scanning the entire free block bitmap as described and finds no free disk blocks, then a request must be made to have all other active cluster systems release any free blocks they have back to the free disk block bitmap. The mechanism to alert other nodes that they are to remove their known free blocks from their individual free block lists (s_free) and to set the appropriate bits in the bit map is via the system attempting to get free blocks requesting the release free blocks resource in exclusive mode. All nodes normally hold the release free blocks resource in protected-read mode; and would be notified that a node wishes to acquire the resource in exclusive mode. Prior to releasing the resource, each node would "give up" its free blocks as described. A time stamp provided as a value return for the release free blocks resource will ensure that on full exhaustion of the filesystem free disk blocks continuous thrashing would be prevented and appropriate failures would occur.

Data Blocks 311

This last portion of the filesystem layout contains data which may be the actual file contents, such as a normal file or directory, or may be an indirect array of disk blocks.

3. External Interfaces 3.1. Distributed Lock Manager

The Distributed Lock Manager (DLM) plays a central role in the control of the CFS. It is used to coordinate access to the various parts of the file system so that the multiple nodes of the CFS all maintain a consistent view. It is also used to monitor for the presence, or absence, of other nodes so that should a node fail, another node may safely correct the damage caused by the failure.

All of this is done by creating DLM "resources" which are uniquely named for the file system and file system piece they represent, and having done this an appropriate DLM lock on the resource is acquired, effectively blocking other nodes from inappropriate access.

Heavy use is made of the DLM feature that allows a DLM user to "notify" another user where the first user desires a lock but the lock can not be achieved without the second user giving up a lock. The CFS normally acquires locks as needed but never relinquishes the locks unless someone else tells the CFS to do so. This minimizes lock activity.

3.2. Cluster Control Daemon

The Cluster Control Daemon (CCD) is a part of the Cluster Control Module (CCM) and it is used to maintain a notion of a cluster. The exact interface to the CCD is not well defined at this time but it will be basically used to:

Provide early notification that a node may have failed. This notification will occur prior to the DLM completing lock manipulations that take place when a node fails. This will allow the CFS to prepare for file system correction activities.

Definitively inform the CFS when a node is in a state that can no longer harm a file system. This, along with DLM lock transitions, will define when correction activities can commence.

Provide a mechanism to automatically distribute configuration data throughout the cluster. Such CFS related data is not well defined at this time.

The CFS is not dependent upon the availability of the CCD. It will use it if available, and if not the recourse will be lower data integrity.

3.3. SCSI Cross Reference

The CFS needs to be able to uniquely identify a file system when mounting it in order to ensure that it is accessing the same data store in the same manner from all nodes; without doing so risks total file system destruction. Unfortunately the data store can not contain this unique identifier in that file systems can be easily duplicated and simultaneously mounted.

A SCSI Cross Reference must be provided to ensure that the CFS is accessing the same data store in the same manner from all nodes. A higher level entity must exist as well, in that the CFS only works well with multiple spindle storage devices (such as DAP) which can span multiple SCSI devices and format the data store in non-straightforward ways.

Assuming the presence of such control entities, the CFS will use them. If not the CFS will require a manual entry of configuration data which will be distributed throughout the cluster by the CCD.

4. Major Components

Figure 4:
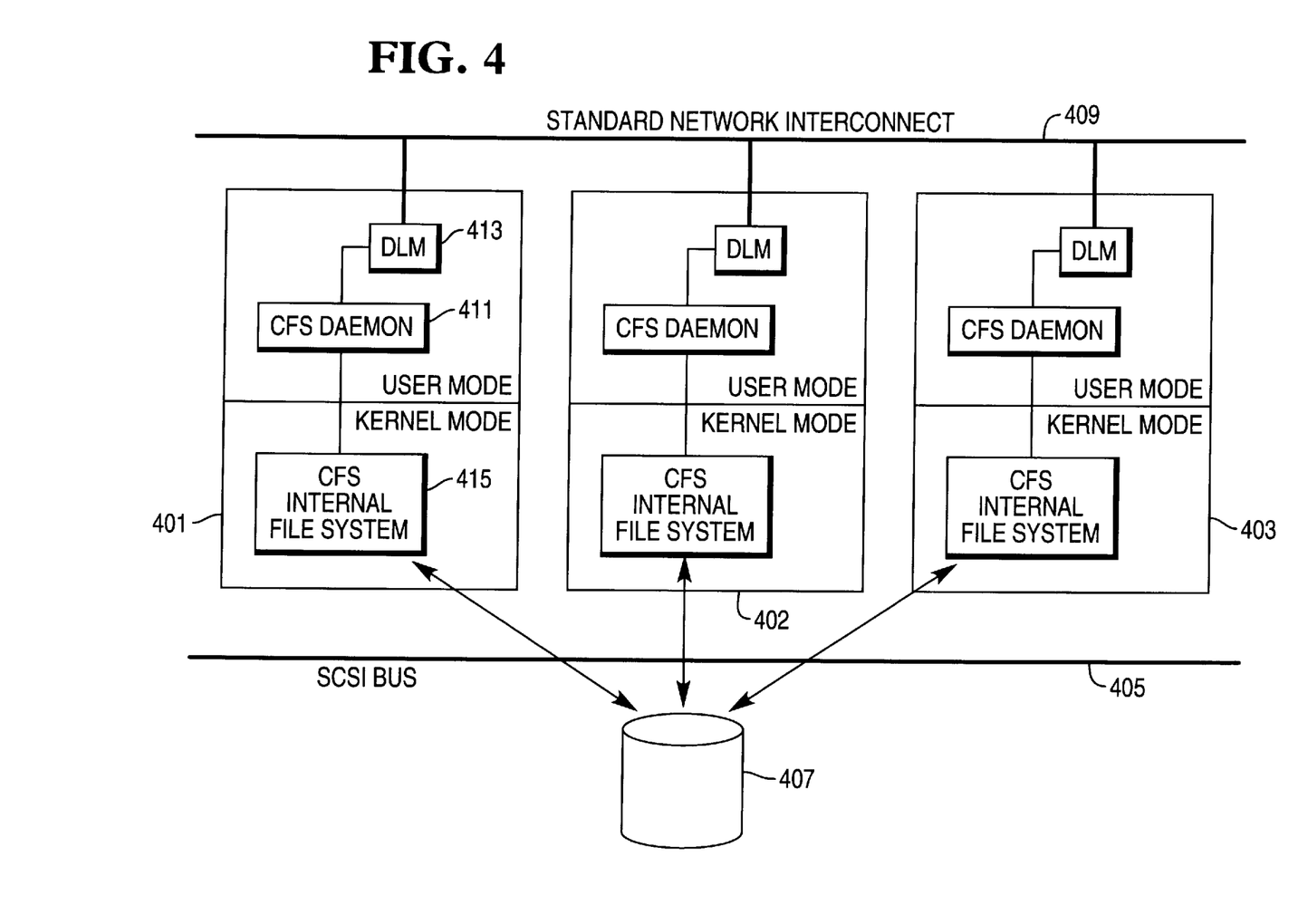
FIG. 4 is a block diagram illustrating the architectural design of a clustered file system in accordance with the present invention.

The major components of the clustered file system, illustrated in FIG. 4, include two or more processing nodes 401, 402 and 403, a shared SCSI bus 405, a common data storage device 407, and a standard network interconnect 409. Major components of the file system contained within each processing node are described below.

4.1. DLM Interface Daemon 411

The CFS has a daemon which interfaces with the DLM in order to acquire and manipulate DLM resources on behalf of the file system. It will hereafter be referred to as the cfsd (Clustered File System Daemon). There will actually be a separate cfsd for each file system that is mounted in order to isolate DLM resources and provide better throughput; the rest of this section will discuss the cfsd as though there was only a single one. Each performs the same functions for their separate file systems in isolation from each other.

4.1.1 Initialization

The cfsd is started as an artifact of the CFS mount command. It is in fact the entity which actually performs the mount system call for the requested file system. The cfsd is forked by the mount command and it will complete the mount and enter a service wait state, or fail the mount and report the failure reason, via pipe, back to the mount command. Initialization activity includes:

Attaching to the DLM. Failure will result in mount failure and termination.

Determination of the superblock to be used and validation that the superblock selected is not damaged. Failure will result in selection of an alternate superblock, or mount failure if no other superblock is selectable.

An attempt to become the file system controlling node. Failure will simply stage the attempt so that should the current controller fail, that this node could take over this service.

If the node becomes the controlling node it will control online fsck and it will perform such activity at an appropriate time shortly after completing the local mount.

If the node becomes the controlling node it will attempt to become the overall CFS controlling node.

Upon completion of all other initialization activities the cfsd will issue a mount command and effectively register itself with the internal file system code as the sole server of DLM lock requests required to service this file system. It then drops into a wait state inside the internal file system (within an ioctl system call) awaiting requests for lock service. Such requests are either generated by other processes accessing the file system locally using normal system calls, or the DLM by way of a signal interrupt.

4.1.2. Interfaces

Distributed Lock Manager. The cfsd exists primarily to interface with the DLM. All normal DLM lock traffic will take place using the cfsd as the placeholder owner of the locks in lieu of the real owner (the internal file system). By and large the cfsd simply reacts to requests from either the internal file system or the DLM by simply passing the requests through to the other. It is a fancy pipeline with little intelligence of its own.

The cfsd cannot correctly function without the DLM. It will not start unless the DLM is present and should the DLM terminate, the cfsd will pass this on to the internal file system and then terminate as well.

Cluster Control Daemon (CCD). The cfsd must also interface with the CCD. Basically the CCD interface will tell the CFS when a node has left the DLM quorum and when that node has indeed reached a benign processing state. Upon reaching this known state the file system controller node instance of the cfsd will initiate any online fsck activity that is necessary.

On a node which is leaving the quorum, the CCD will inform the CFS to unmount the file system as soon as possible in order to minimize or eliminate file system damage.

Internal File System. The Internal file system is a standard SVR 4.0 MP-RAS based file system which interfaces to the cfsd using two specific system calls:

The mount system call constructs the necessary data structures required to support file system service for a specific file system instance. It also registers the cfsd as the sole control point for DLM lock traffic concerned with the specific file system.

The ioctl system call is used for all post-mount communication between the daemon and in internal file system. A multiplexed 2-way interface will be used to allow each transition into and out of the internal file system to pass a large number of new requests or responses. When no outstanding work exists for the daemon it will be sleeping inside the file system code in the ioctl routine. It can be awakened by new work arriving from either the file system or from the DLM, e.g., work from another node.

Online fsck Daemon. The controlling node will from time to time find it necessary to instigate the execution of an on-line fsck based on either the failure of another node or the corruption of a currently unused superblock. It will not perform this work itself but rather it will fork and execute another process, the online fsck daemon, which will actually drive the correction of the possible file system damage.

Special Signal Handling. Miscellaneous signal handling devices will be employed for special activities within the cfsd. While this is not well defined at this time they will include early node failure notification from the CCD and generation of performance monitoring metrics.

4.2. Internal File System 415

4.2.1. Interfaces

DLM Interface Daemon (cfsd). The coordination of the file system amongst the cluster of systems is performed through the use of DLM locks. As part of all internal file system operations which act upon the common file system image, requests will be made to acquire and manipulate DLM resources. As the actual DLM interface is at user level, the DLM interface daemon provides the conduit by which the internal file system makes requests and receives responses to and from the DLM. The internal file system and the cfsd daemon(s) interface through the CFS ioctl() routine.

For the purposes of improved throughput in systems having multiple cluster file system instances mounted, a separate cfsd daemon process will handle each file system. The internal file system will keep track of which daemon handles which file system, and pass requests and receive responses appropriately. The association of a particular cfsd to a file system is established via the mount sequence; the internal file system will record the particular cfsd handler details (e.g. process number) for subsequent use.

The CFS ioct() routine will handle several types of requests from a cfsd process.

CFS_CMD_WAITREQ, CFS_CMD_NOWAITREQ

This is the primary ioct() request for communicating DLM CMD requests and responses. The mechanism is that the daemon supplies a pointer to a user level data structure which can be filled in by the internal file system code with DLM resource requests. In addition, DLM responses and notification data is provided from the daemon to the file system through this data structure. When no outstanding file system actions require DLM resource requests be passed to the cfsd process, the cfsd process will normally be placed in a sleep() in the ioctl handling routine. The cfsd handler will awakened by either file system activities requiring DLM resource manipulation or via signals from the DLM environment against the cfsd process, e.g., work from another node and DLM responses. When the cfsd process has additional outstanding work (responses) for the file system which it expects to pass down after a current ioctl request, the ioctl command argument used would be CFS_CMD_NOWAITREQ; indicating that no sleep should be performed by the ioctl functions.

The data structure used for passing cmds and responses between cfsd and the filesystem is currently defined to pass 10 DLM requests & 10 responses.

CFS_CMD_SHUTDOWN

This request will be passed to the internal file system in the event that the DLM environment fails or other cfsd activity determines any fatal errors dictate that the file system access be immediately shutdown. The result of this request should be that all DLM resource information held by the file system be destroyed and all users be notified via errors returned on all outstanding requests.

CFS_CMD_SETTIME

This command used for the coordination of time stamps applied to files in a manner that is consistent both across nodes as well as file systems. This may eventually be done by some non-CFS specific entity which coordinates system clocks. Until such time as such a facility exists, the CFS overall coordinator will pass a time stamp value throughout the cluster through lock values between cfsd instances, cfsd processes will pass this value to the file system via this ioctl command as its argument. The file system will retain the difference between its system time and the time stamp for purposes of providing times in the cluster file system related functions.

Several other cfsd utilized commands may exist for special operational tuning, performance metrics and debugging access for the file system.

UNIX Virtual File System (VFS) The cluster file system will function and interoperate fully within the UNIX SVR4 Virtual File System (VFS) environment. The overall requirement and design guideline is that all the necessary functions for vnops and vfsops capabilities will be provided. The fundamental data element interfaced between general file system functions in UNIX OS and the CFS code will be the vnode. The vnode data structure will be held with in the CFS incore inode structure. Translation between a vnode pointer and the incore inode pointer for any CFS file operations will be therefore straightforward.

4.2.2. Inode Control

Access to inodes must be protected within several aspects of parallelism in this file system. First inodes must be "locked" within a system so that different user processes can access the same inodes (files) in "critical sections", without unintended collision, this will be ensured through the use of a internal system lock on each incore inode (using i_flag ILOCKED bit). To ensure proper operation within SMP configurations multiprocessor locks are used (using VFS vnode VNL_LOCK). The final protection is for users on different systems accessing the same inodes (files), for this case DLM resources will be used.

Whenever the file system creates an incore inode, a request will be made to the CFS DLM interface daemon cfsd to create a DLM inode access resource. The file system code will request and acquire a lock level of protected-read whenever examination of the inode or its data blocks is required. When the file system code is going to modify any inode information or its data blocks it must acquire the inode access resource in exclusive mode, the only exception is for an access time adjustment.

An inode access resource is maintained so long as the incore inode exists and its lock is maintained at the highest level requested so long as possible.

In addition to the inode access resource manipulation, a second DLM resource for each created incore inode will be acquired to track references to a inode (the DLM inode reference resource). The inode reference lock is opened and initially acquired in tandem with the opening and acquisition of the inode access lock. The inode reference lock is maintained for the life of the internal inode at protected-read level. In particular when an inode is placed on the free list (its local reference count is 0) the inode reference lock will be guaranteed to be at least at protected-read level. This will ensure that the processing node will be assured of being notified whenever another node attempts to acquire the lock at exclusive level.

When the condition arises that the inode link count becomes 0 (the file has been unlinked) and the local reference count becomes 0 the following combination of lock activity will occur:

The inode access lock will be acquired in exclusive mode.

The inode reference lock will be have a no-queue attempt to acquire the exclusive mode. A no-queue request to the DLM will fail if another node holds the inode reference lock in protected-read mode. In this case this processing node can be assured that another node holds an interest in the inode and will at some time in the future go through a similar flow of activity on the inode. This node can simply proceed with a total teardown of the internal inode and close both locks.

If the node acquires the inode reference lock in exclusive then the implication is that this is the last processing node to hold an interest in the inode and therefore can proceed with the traditional truncation and removal of the file.

For the purposes of potential recovery from system failures, a record of modified inodes will be kept within the Modified Inode Journal bit map which exists for each cluster member system (associated with the specific superblock used by a node). An individual Modified Inode Journal bitmap will provide indication to the on-line recovery function that particular inodes may have been modified by the respective system prior to a system failure (and thus may be damaged). A bit representing a specific inode is set (=1) whenever an in-core inode is created and an exclusive inode lock is acquired prior to any modification. The bit is cleared whenever an inode lock is closed (and the bit had previously been set).

4.2.3. File Data Blocks (Use of Inode Space)

As discussed previously the layout of the file system will support storage of some file data directly in the inode block.

Several design options exist for the use of the inode block space for data.

Option 1: First x bytes of file stored in inode.

The file system will store the first 1024 (or 512 or ??) bytes of a file in the inode block. Thus anytime access is made to the first data of a file it would be from the inode block; and then from the data blocks listed in the inode data structure direct and indirect logical block address information. This would imply that for small files, all the file data would be stored in the inode block.

Option 2: Last x bytes of file stored in inode

The file system will store data in the inode block whenever the remainder of a file after filling 2048 byte logical blocks fits.

Specifically: Inode block holds data when (di_size modulo 2048)<=1024. ((di_size & 0x400)==0) && (di_size & 0x3ff) This implies that file system functions related to the writing and/or appending to a file must handle relocating data when the file grows beyond the 1024 remainder condition.

Option 3: Use inode block space for only small files (all data in inode block)

If the file size [di_size] is less than some value, e.g., 1024 or 512, all of the file data is stored in the inode block. Like option 2, this would imply copying data from the inode block to a normal data block as the file grew beyond the specific size; also if the file shrank [truncated] a similar copy might have to be made back to the inode block.

An alternate version of this option might be to only store data in the inode block until the file size grew, and then for ever after use data blocks, even if the file became small enough to again fit in the inode block. Some status bit in the inode structure would then have to indicate if the inode contains the data or a data block.

4.2.4. Free Inode Control

Each system maintains its own individual and unique list of free inodes within the filesystem superblock data structure array s_inode. This array provides up to CFSNICINOD free inode indexes. When a free inode must be allocated for some file activity such as creating a new file, this array would be manipulated, removing a free inode from the list. The value of s_ninode indicates the next free inode to be removed and also provides the total present number of free inodes in the s_inode array. Whenever an inode is freed, the inode would be added to the s_inode array, if array space is available. Whenever the local free inode array is exhausted or becomes filled to its maximum, then it will be necessary to manipulate the "shared" free inode bitmap for the cluster file system. A set of DLM resource locks will be used to ensure integrity in the shared bit map.

Using the resource locks the bitmap would be scanned by a system needing free inodes and marked free inodes would be collected into its own free inode list and the corresponding bit "flipped" to zero. In the case where a system would exceed the bounds of its free inode array and it has to free another inode; then the bitmap would be modified to indicate the respective inodes are "free" (set to 1) after removing the inode from its own free list.

This use of the bitmap eliminates the need to scan through the inodes themselves to find free ones; improving performance by having less contention and disk I/O during inode allocations.

To additionally assist in reducing contention for the same portion of the inode bitmap, the value from the free inode resource lock will indicate which portion of the free inode bit map to use next. Refer to the DLM free inode resource section for more detail.

4.2.5. Free Block Control

Each system maintains its own individual and unique list of free blocks within the filesystem data structure array s_free. This array provides up to CFSNICFREE free block logical addresses. In addition, chains of free blocks are possible, in that the zero element of each array can point to yet another array list. When a free block must be allocated for some file activity such as appending to a file, this array would be manipulated, removing a free logical block address from the list. The value of s_nfree indicates the next free block array element to be removed and also provides the total present number of free blocks in the s_free array. Whenever an block is freed, the block's logical address would be added to the s_free array, if array space is available. Whenever the local free block array is exhausted and s_free[0] is non-zero then the value of s_free[0] is used as a logical block address of a new free block list to fill s_free[]. If the free block array is exhausted and s_free[0] is zero then it will be necessary to use the "shared" free block bitmap for the cluster file system. A set of DLM resource locks will be used to ensure integrity in the shared bit map.

Using the resource locks the bitmap would be scanned by a system needing free blocks and marked free blocks would be collected into its own free inode list and the corresponding bit "flipped" to zero. Blocks would be placed on the s_free[] array so that when later allocated for regular files they would be ordered properly for best performance, e.g., increasing and contiguous if possible. The amount of free blocks taken from the free bit map on any given attempt would be 512. If as a result of scanning the bitmap of free blocks, less than 50 free blocks are found, then a "request" will be made to other nodes to "give up" their free blocks back on to the free block bitmap. This "give up free block" request is performed via the system needing free blocks requesting a conversion of the "release free block" DLM resource from protected-read to exclusive lock level; all other nodes hold the resource at protected-read level and would receive notification that another node needs the resource. At this notification, each system would release all of their free blocks to the free block bit map and cycle the release free block resource lock level to NULL and back to protected-read. To ensure that thrashing of this lock will not occur when the file system has truly reached exhaustion, a common time stamp, such as passed in the clock resource value block, is stored in the "release free blocks" resource value block upon dropping the exclusive lock.

When a system frees blocks in the normal course of internal file system activity, such as the result of truncating a file, the free blocks are chained on its own individual free block list. The only time free blocks are returned to the "shared" free block bit map is by the release free block lock request described in the previous release conditions or when a node unmounts the file system.

To assist in reducing contention for the same portion of the free block bitmap, the value from the free block resource lock will indicate which portion of the free block bit map to use next.

5. DLM Locks

The CFS uses the DLM and its API to control and coordinate access to the file system across the cluster. File system resources will be equated to DLM resources, unique names imposed and locks of various levels will be acquired in order to allow access.

In general the CFS will attempt to minimize DLM use by only creating DLM resources when needed, and only relinquishing DLM locks when necessary. This means that DLM resources associated with dynamically accessed file system entities, like files, will not be created until a file is accessed, and then will be maintained at the highest requested lock level so long as the incore inode data structure remains viable and no other node requires a lock on the same resource at a level that would require a downgrade.

5.1 Lock Definitions

The CFS needs a separate DLM resource name space for each file system. This is discussed in greater detail later in this section. How this is done will be ignored for now and each lock type used will be discussed using a generic name. Keep in mind however that each such lock is in a set which only deals with a single file system.

5.1.1. The "Boss" Resource

The boss resource is created by the 1st node to mount the file system. An exclusive level lock is attempted by every node mounting the file system. One node will win and becomes the controlling node for the file system.

The implication of being the controlling node is that should another node fail, the controlling node will perform the necessary on-line recovery for the failed node.

Should the controlling node fail, another node will as an automatic result of normal DLM functionality acquire the exclusive boss lock and thus become the new controlling node. Because the acquisition of the boss lock in this case will occur after the old controlling node has failed, a second implication of acquiring this exclusive lock will be to check any unused superblocks for correctness, and perform online correction for any found to be corrupt. Unused superblocks can be determined using the superblock locks defined later in this section.

One final implication of being the controlling node of a file system will be that it will attempt to acquire the overall coordinator resource with an exclusive lock.

5.1.2. The "Overall Coordinator" Resource

There exists a need to coordinate certain activities which span the bounds of a single file system. The one such activity known at this time is the coordination of time stamps applied to files in a manner that is consistent both across nodes as well as file systems. This may eventually be done by some non-CFS specific entity which coordinates system clocks. Until such time as such a facility exists and for other potential overall coordination activities, the CFS daemon of the controlling node of each file system will attempt to acquire the overall coordinator exclusive lock. If successful, it will become the overall coordinator. Should it fail then another daemon will as an automatic result of normal DLM functionality acquire the exclusive overall coordinator lock and thus become the new coordinating daemon.

5.1.3. The "Clock" Resource

The clock resource is accessed by all daemons. All nodes normally acquire a protected-read level lock on this resource and obtain from the value block a common time stamp. Each daemon in turn passes this value down to the kernel level file system where the kernel uses it to determine a positive or negative adjustment to the local time stamps to be applied. Because there may be many file systems (and hence daemons) passing the same value down to the kernel, only the first arrival of a time stamp in the kernel need be used.

The overall coordinating daemon will periodically convert its protected-read lock to exclusive level, repopulate a new coordinated time stamp into the value block, and cycle the lock level back down.

5.1.4. The "Superblock" Resources

Each node mounting a file system will attempt to acquire a superblock resource lock at exclusive level to define it's mount control superblock. Acquisition of this lock will allow the mount to continue.

Failure to acquire an exclusive lock due to another node already having the lock will result in backing off and trying for another, up to the maximum number for that file system instance. Alternatively, the administrator may have specified a particular superblock to be used as a parameter of the mount command. If so only that lock will be attempted.

The controlling node of the file system will attempt to acquire the superblock exclusive locks of all superblocks in the file system. The acquisition of each superblock resource will result in a check to determine if an online recovery must be performed and if so the controlling node will perform it. The controlling node will only relinquish the superblock exclusive lock on a superblock which is not corrupt.

5.1.5. The "Inode Reference" Resources

An inode reference resource is created whenever a new incore inode is created. The corresponding lock is acquired at protected-read level initially and does not honor requests to give up the lock. It may cycle up to exclusive if the link count becomes zero. This would occur only when the inode has returned to the freelist (the local reference count is 0) and this is the last node to "know about" the inode.

5.1.6. The "Inode Access" Resources

An inode access resource is created whenever a new incore inode is created. The corresponding lock is acquired at whatever level necessary to complete the required activity. A simple examination of an inode requires a protected-read lock, while any modification other than an access time adjustment will require an exclusive lock. An inode access resource is maintained so long as the incore inode exists and its lock is maintained at the highest level requested so long as possible.

5.1.7. The "Free Inode" Resource

The free inode resource is acquired with an exclusive lock whenever the node wishes to modify the free inode bit map. It is acquired, the value block examined for a value, the value block incremented, and the lock is dropped back to null-lock level. The value is returned to the kernel file system and is used to determine the starting point of access to the bitmap. This is used to minimize node contention for the free block bitmap.

5.1.8. The "Free Inode Bitmap" Resources

The free inode bitmap resources exist in a one-to-one correspondence to the logical blocks of the free inode bit map. The corresponding resource exclusive lock is acquired whenever a node wishes to examine or modify the block. Upon completion of the examination the block is written back out to the disk (if modified) and the lock is dropped to null-lock level.

5.1.9. The "Free Block" Resource

The free block resource performs the analogous function for the free block bit map as does the free inode resource for the free inode bit map.

5.1.10. The "Free Block Bitmap" Resources

The free block bitmap resources performs the analogous function for the free block bit map blocks as does the free inode bitmap resources for the free inode bit map blocks.

5.1.11. The "Release Free Blocks" Resource

The "release free blocks" resource is used by a node to inform the other nodes to relinquish extra free blocks from their respective free block lists. All nodes normally hold a protected-read lock on this resources. A node that needs to acquire a number of free blocks and is unable to do so using normal mechanisms can request the remaining nodes to relinquish a portion of their free block lists by acquiring an exclusive lock on this resource. The other nodes will be expected to perform this release activity prior to allowing the requesting node's exclusive lock to complete. Upon acquisition the activity has been performed. The common time stamp, as passed in the clock resource value block, is stored in the "release free blocks" resource value block upon dropping the exclusive lock. This is done to ensure that thrashing of this lock will not occur when the file system has truly reached exhaustion.

5.2. Unique Naming Conventions

The CFS internal file system code will support multiple file system instances at the same time. Each must be uniquely controlled across the entire cluster in order to guarantee data integrity. This is done using DLM locks. The problem exists of how to identify one file system instance from another on order to acquire the appropriate locks for that file system. Lock name spaces are totally isolated on a file system instance basis by creating unique names for each file system instance. The current design intent is to prepend a unique identifer to a common set of names. The identifier will be unique to the file system instance but common across the nodes of the cluster that have that instance mounted.

6. CFS Applications

CFS provides improved availability and scalability for a wide range of application types. An ideal application for a CFS file system would be one where there are a large number of users which could not be supported on one node and where there is a high ratio of read activity to write activity. With CFS, such an application can approximate the access speed of a wholly-local file system because CFS grants read access privileges to multiple nodes concurrently.

Generally, any application which can be run on a set of NFS clients can be run within a CFS cluster. Specifically an application can be distributed if it uses sockets, TLI, or traditional UNIX file and record locking for its coordination control. A CFS file system, however, can not be used as a root file system. The network must be accessible for the CFS to function and this occurs long after boot time. This also prevents the CFS from being used for /usr or /var as well. Because special device files can only map to devices on a local node, they are not supported in order to avoid confusion.

6.1. Supported Application Types

Although CFS is uniquely designed to support applications distributed across a cluster, CFS has the flexibility to more effectively support processing on a range of single- and multiple-node applications. For example, CFS provides improved availability and reliability for these applications types: home file system, news or mail server, multiple NFS server support, and single node.

6.1.1. Home File System

A group of developers large enough to overwhelm one node would improve their response time by placing their /home file system on a CFS cluster. The developers could essentially log into any node in the cluster and see the same environment and the cluster would provide very low inter-node contention.

6.1.2. A News or Mail Server Application

CFS can improve processing by distributing the users of a mail or news service over a number of cluster nodes. Users have improved access because they do not all connect to the same system, but their range of read activities and low write contention minimizes resource contention.

6.1.3. Multiple NFS Server Support

A CFS cluster can provide multiple NFS servers for a file system, as illustrated in the diagram on the next page. The clustered servers provide greater connectivity and availability for the NFS clients. If any node fails, CFS allows other nodes to be designated as backup entry points for users originally assigned to the failed node.

CFS clusters can save both time and disk storage. Instead of requiring software installation on each server, for example, shared software installed in a CFS file system is immediately available to all nodes.

6.1.4. Single Node Applications

Any application designed to run on a single system can also run effectively on a single node of a CFS cluster.

7. CFS Operations

CFS uses a distributed lock manager (DLM) to coordinate access privileges across the cluster and to guarantee a consistent view of the file system across all of the nodes. Once a mount is issued, the DLM establishes a basic set of file system access privileges which every other processing node in the cluster must honor. While file system access is entirely local, CFS uses the network to coordinate access privileges to specific files when they are requested by CFS users. Both local and network management is entirely transparent to users.

Perhaps the best way to demonstrate the power of CFS processing is to illustrate the way CFS manages read transactions, a request for a write transaction from one node, and a request for a read or write transaction from a second node.

7.1. Read Transactions Example

Figure 5:
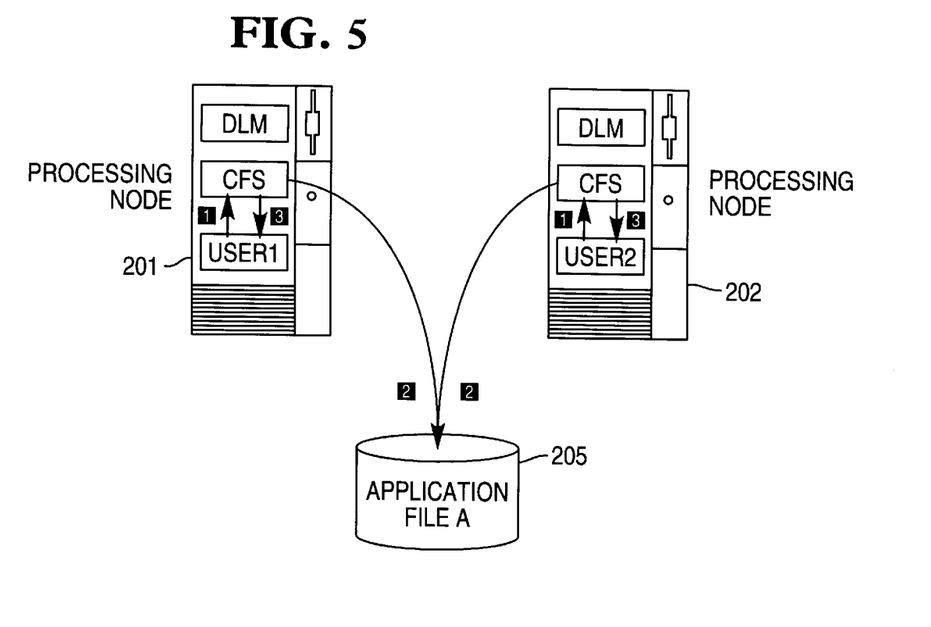
FIG. 5 illustrates the process employed by the clustered file system to conduct a read transaction within the clustered computer system.

CFS processes multiple read requests simultaneously, as long as there is no read contention. As shown in FIG. 5, the direct access process for each read transaction involves three steps that do not involve the network.

The following listed tasks for read access can occur concurrently for multiple users:
1. Read call. Users send read system calls to the file system.
2. CFS reads file. CFS on the requesting nodes reads the disk.
3. CFS displays data. CFS passes the requested data to the users.

7.2. First Write Transaction Example

CFS grants write privilege to a cluster node the first time a write is performed, then all subsequent write system calls from that node require only the local access steps as long as there is no contention. When CFS grants access privileges to a node, the privilege extends to all users on that node The following sections illustrate and describe the processing steps for the initial write request and the processing steps for all subsequent write requests on the same node.

7.2.1. Processing a First Write Request

Figure 6:
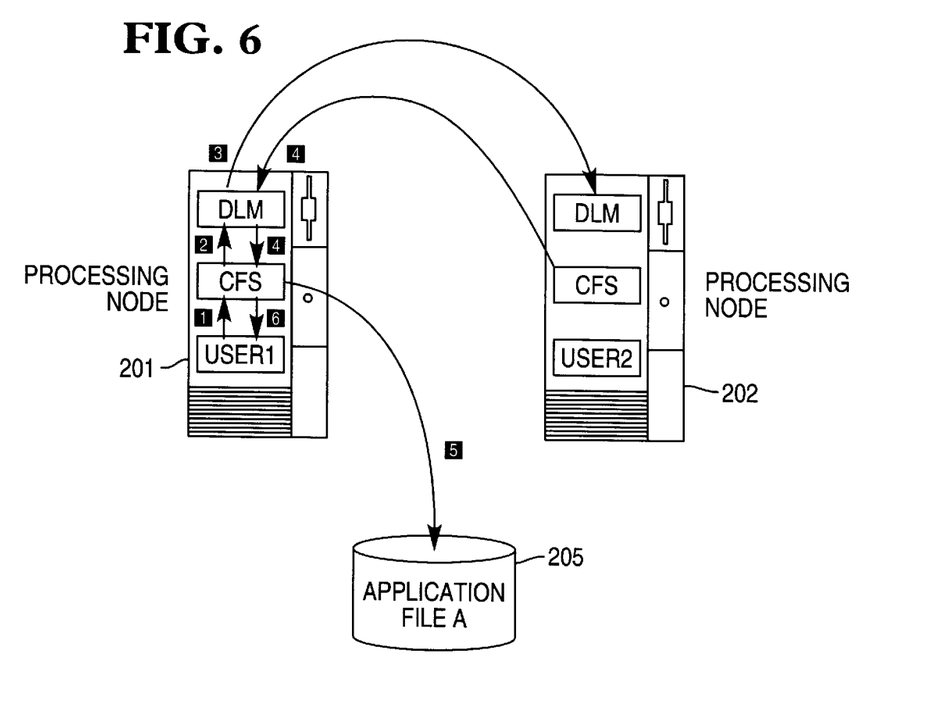
FIG. 6 illustrates the process employed by the clustered file system to execute a first write request from a first processing node within the clustered computer system.

During the first system write call, CFS grants the write privilege to all users on the requesting node. FIG. 6 illustrates the processing flow for the first write request on a node.

Provided below are the processing tasks for the first write call on the first node:
1. Write call. The application user issues a "write" system call.
2. Write privilege request. When CFS receives the system call the first time, DLM initiates the process to grant write privilege. The same node needs to obtain the privilege only once.
3. DLM network communication. Depending upon the node ownership of the resource, the DLM may need to communicate across the network in order to obtain the requested privilege.
4. DLM grants write privilege. After the DLM obtains the write privilege, it passes it back to CFS.
5. CFS writes. CFS can now honor the user request to write the file to the disk.
6. CFS returns the write call. CFS completes the system call back to the user.

7.2.2. Processing Subsequent Write Requests

After the node obtains a CFS write privilege, all subsequent write system calls from all users involve only three processing tasks. This simplified processing flow, illustrated in FIG. 7, mirrors the steps required by any local file system as long as no other node wishes to access the same file.

Figure 7:
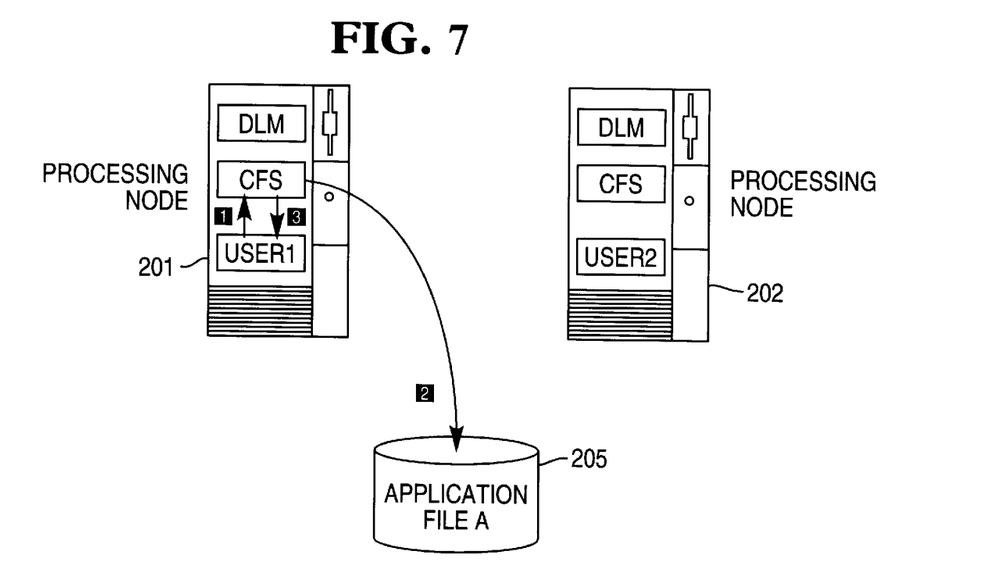
FIG. 7 illustrates the process employed by the clustered file system to execute a subsequent write request from the first processing node within the clustered computer system.

These are the processing tasks for subsequent write calls from the same node:
1. Write call. The application user issues a "write" system call.
2. CFS writes. CFS honors the user request to write the file to the disk.
3. CFS returns the write call. CFS completes the system call back to the user.

7.3. Second Write Transaction Example

The following sections describe and illustrate the steps required to process the first read or write request by a second node and subsequent requests from that same node. Note that in addition to the CFS privileges, the DLM transparently manages all read and write requests to ensure the data integrity of all cluster resources.

7.3.1. Processing the Second Node's First Request

Figure 8:
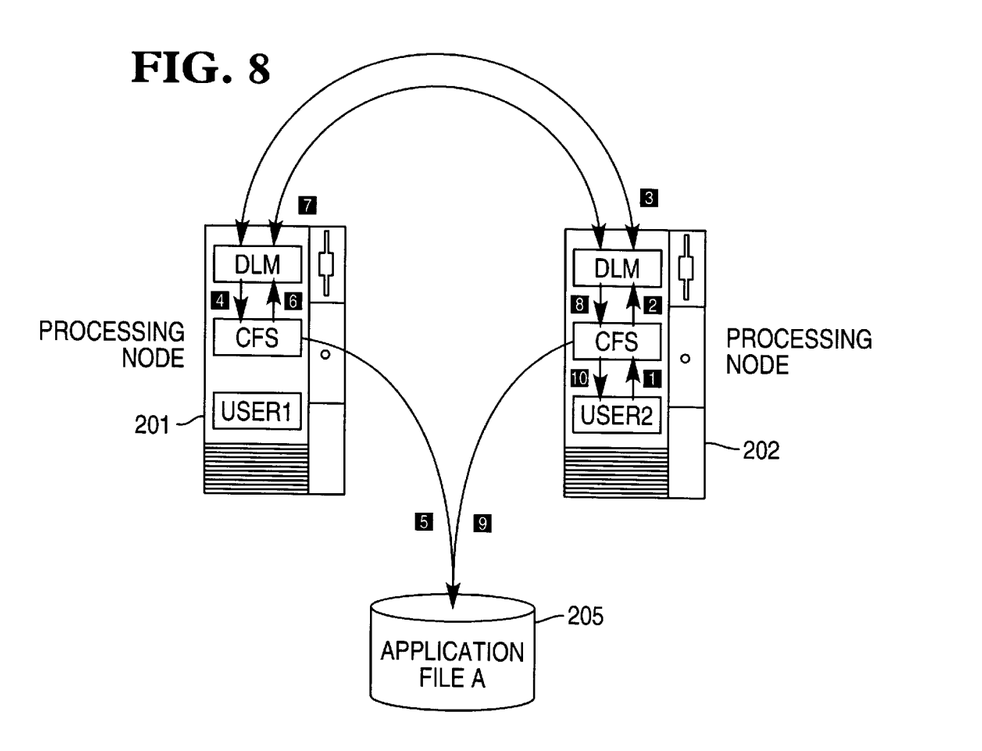
FIG. 8 illustrates the process employed by the clustered file system to execute a first read or write request from a second processing node within the clustered computer system.

After one node receives write privileges for a file, CFS requires additional processing steps to grant privileges when another node has an application user making a first request to read the same file. As shown in FIG. 8, the first node must relinquish the write privilege in order for the second node to perform a read or write to that same file.

When another node has write privileges, these are the processing tasks for the first read or write call from a second node:
1. Read call. User2 sends a read system call to the file system.
2. Read privilege request. CFS determines that the user does not have read privilege to the file and requests the DLM to acquire that privilege.
3. Privilege change request. The DLM on the local node notifies the DLM on the other node that a privilege change is requested.
4. DLM requests first node to relinquish write request. The DLM notifies CFS on the node holding the write privilege to relinquish that privilege as soon as practical.
5. CFS flushes modifications to the file. In order to relinquish the write request, CFS must flush to disk all modifications made to the file by the user granted the write privilege.
6. CFS relinquishes write privilege. After flushing the modifications, CFS relinquishes the write privilege.
7. DLM notifies requesting node. The DLM notifies the DLM on the requesting node that the lock is now available.
8. DLM grants read privileges. The DLM on the requesting node passes the requested read privilege to CFS.
9. CFS reads file. CFS is now free to read the disk, knowing that the disk copy of the file is up-to-date.
10. CFS displays data. CFS passes the requested data to the user.

7.3.2. Subsequent Read Requests from the Second Node

Figure 9:
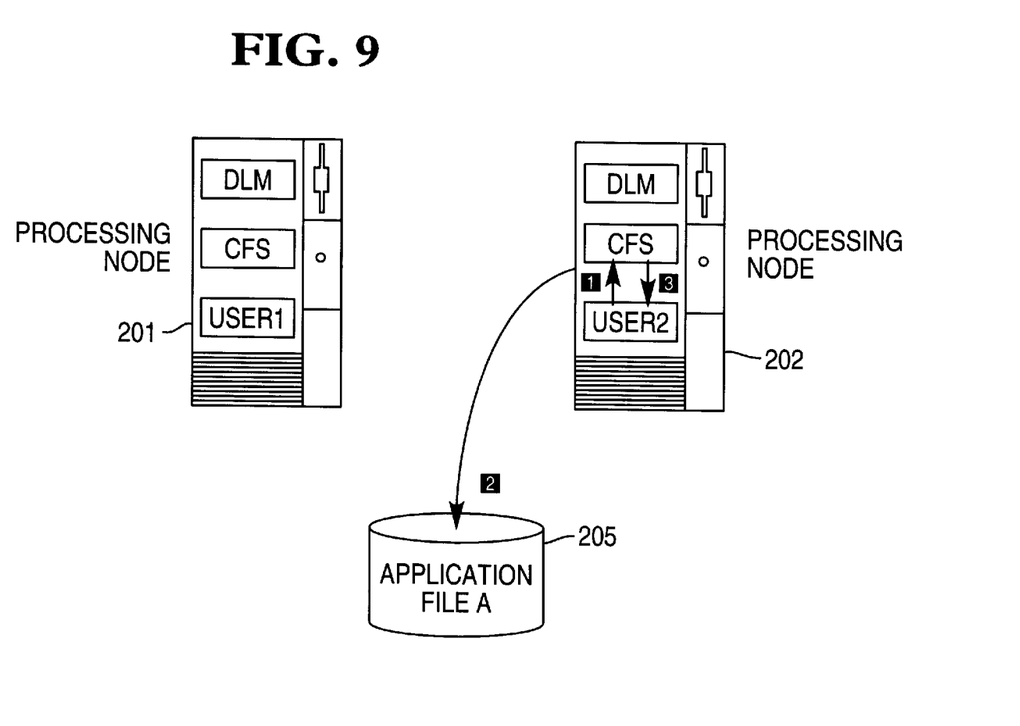
FIG. 9 is a illustrates the process employed by the clustered file system to execute subsequent read requests from the second processing node within the clustered computer system.

Subsequent reads by the users on the second node require only the simplified processing path described below and illustrated by FIG. 9. The only interruption to this reading path occurs if the first node's users perform additional write operations. Whenever a node requires write privilege, all other nodes with read or write privilege must relinquish their privileges. CFS monitors all activity and changes the processing approach to ensure that all users see an up-to-date file at all times, and the DLM manages resource locking to ensure data integrity.

These are the processing tasks for subsequent read or write requests from the second node.
1. Read call. User2 sends a read system call to the file system.
2. CFS reads file. CFS is now free to read the disk, knowing that the disk copy of the file is up-to-date.
3. CFS displays data. CFS passes the requested data to the user.

8. Full File System Semantics

Because CFS is a true local file system, full file system semantics are available. This basically means that the file system conforms to the standard definition of a file system. It has the same system calls and same return values.

Most applications require a coordination mechanism in order to synchronize the various processes that make up the application. Mechanisms traditionally used to synchronize processes, such as signals, pipes, streams, IPC messages, and semaphores, also work on applications which use CFS for basic storage. These mechanism, however, do not work when the application is executed on more than one node at the same time. Further, named pipes are converted into streams which do not span processors. As a result named pipes would cause confusion and are not supported.

The mechanism that does work for multi-node processing is UNIX file and record locking. A lock acquired on one node is honored on another node. Therefore, an application that used only file and record locking for internal coordination purposes can view the cluster as one virtual system and thus be totally distributed within the cluster.

9. Cluster Performance

The usage pattern of files across a cluster, to a large degree, determines the performance characteristics seen by the user. If a single node is accessing a file (reading or writing), then that node acquires access privileges to the file once (and only once) through the network no matter how many separate users of the file exist on that processing node. CFS access privileges are shared by all users on a single node. With single node access, access speed for the file approximates a local file system such as the UFS de facto standard UNIX file system.

If multiple nodes in a cluster need to access the same file at the same time, then the presence or absence of writers in the user set determines performance. The actual number of users on any processing node is not relevant because CFS grants access privileges to all users on a node. If there are no writers, access speed approximates a wholly-local file system in that any node in the cluster may be granted read access privileges concurrently with any other node. However, note that since each node acquires the data from the disk directly there will be more I/O activity taking place on the disk.

If multiple nodes access the same file and one or more writers exist, the frequency of the read to write activity determines performance. Whenever a writer needs to be given write privilege, any other node with read or write privilege must relinquish that privilege. This not only means network file control traffic, but also involves the flushing out of the nodes local memory store. This may result in extra I/O activity later in order to recover a required state.

Similarly, a writer node prior to giving up write access privilege must flush any modifications to the disk data store. CFS requires this flushing to guarantee a coherent file system viewpoint for all nodes. In short, files with low contention across nodes will perform at the high speeds typical of a local file system while those with heavy contention will see performance typical of a networked file system.

It can thus be seen that there has been provided by the present invention a new and useful file system design for use within a clustered computer system which permits simultaneous and direct access to a common file system disk store from multiple nodes in the cluster. The file system design utilizes the clustered system's distributed lock manager to minimize internode communication and contention in order to maintain the cluster file system in a coherent state.

Although the presently preferred embodiment of the invention has been described, it will be understood that various changes may be made within the scope of the appended claims.

What is claimed is:

1. In a clustered file system including a plurality of processing nodes, an interconnection network connecting said processing nodes, and a common data storage device connected via a shared interconnect with each one of said plurality of processing nodes, a method for directly accessing said common data storage device simultaneously from all of said plurality of processing nodes; the method comprising the steps of:

providing a distributed lock manager (DLM) for coordinating file system access among said plurality of processing nodes;

providing a file system structure, saved to said common data storage device, which provides sufficient information to enable all of said processing nodes to access said file system;

providing a DLM Interface Daemon within each one of said plurality of processing nodes for interfacing said file system with said DLM to permit said file system to make requests to and receive responses from the DLM for coordinating file system utilization.

2. The method in accordance with claim 1, wherein said file system structure comprises:

superblocks containing offsets to all other file system structures within said file system;

a free inode bit map containing a plurality of bits, each bit representing an inode within said file system;

a modified inode journal containing a separate inode bit map for each superblock and identifying particular inodes which have been modified by the file system prior to a system failure;

a plurality of inodes, each inode being a data structure which contains a definition for each particular file and directory in the file system;

a free block bit map containing a bit map wherein each distinct bit represents a logical disk block in the file system; and data blocks containing data representing file contents.

3. An improved file system for managing data storage and retrieval in a clustered computer system including a plurality of processing nodes and an interconnection network connecting said processing nodes, the improvement comprising:

a data storage device connected via a shared interconnect with each one of said plurality of processing nodes;

a file system structure maintained on said data storage device comprising:

superblocks containing offsets to all other file system structures within said file system;

a free inode bit map containing a plurality of bits, each bit representing an inode within said file system;

a modified inode journal containing a separate inode bit map for each superblock and identifying particular inodes which have been modified by the file system prior to a system failure;

a plurality of inodes, each inode being a data structure which contains a definition for each particular file and directory in the file system;

a free block bit map containing a bit map wherein each distinct bit represents a logical disk block in the file system; and data blocks containing data representing file contents.

4. A file system layout for a clustered file system including a plurality of processing nodes, an interconnection network connecting said processing nodes, and a data storage device connected via a shared interconnect with each one of said plurality of processing nodes, the file system layout comprising:

superblocks containing offsets to all other file system structures within said file system;

a free inode bit map containing a plurality of bits, each bit representing an inode within said file system;

a modified inode journal containing a separate inode bit map for each superblock and identifying particular inodes which have been modified by the file system prior to a system failure;

a plurality of inodes, each inode being a data structure which contains a definition for each particular file and directory in the file system;

a free block bit map containing a bit map wherein each distinct bit represents a logical disk block in the file system; and data blocks containing data representing file contents.

5. A clustered file system, comprising:

a plurality of processing nodes interconnected through a network;

a common data storage device;

an interconnection bus connecting said plurality of processing nodes with said common data storage device;

a distributed lock manager (DLM) for coordinating file system access among said plurality of processing nodes;

an internal file system contained within each one of said plurality of processing nodes; and a DLM Interface Daemon contained within each one of said plurality of processing nodes for interfacing said internal file system with said DLM to permit said file system to make requests to and receive responses from the DLM for coordinating file system utilization.

* * * * *